(12) United States Patent
Kwon et al.

(10) Patent No.: US 7,259,915 B2
(45) Date of Patent: Aug. 21, 2007

(54) MICROLENS ARRAY SHEET

(75) Inventors: Hyouk Kwon, Seoul (KR);
Chang-Hoon Oh, Seoul (KR);
Young-Joo Yee, Gyeonggi-Do (KR);
Ji-Hyouk Chung, Seoul (KR); Tae-Sun Lim, Gyeonggi-Do (KR)

(73) Assignees: LG Electronics Inc., Seoul (KR); LG Micron Ltd., Gyeongsangbuk-Do (KR)

( * ) Notice: Subject to any disclaimer, the term of this patent is extended or adjusted under 35 U.S.C. 154(b) by 12 days.

(21) Appl. No.: 11/138,376

(22) Filed: May 27, 2005

(65) Prior Publication Data

US 2005/0264863 A1    Dec. 1, 2005

(30) Foreign Application Priority Data

May 31, 2004    (KR) .................. 10-2004-0039328

(51) Int. Cl.
*G02B 27/10*    (2006.01)
(52) U.S. Cl. .................. 359/619; 359/623; 359/453
(58) Field of Classification Search .............. 359/248, 359/619, 620, 621, 623, 624, 453, 452
See application file for complete search history.

(56) References Cited

U.S. PATENT DOCUMENTS

| 5,555,476 A | 9/1996 | Suzuki et al. |
| 5,581,379 A | 12/1996 | Aoyama et al. |
| 6,262,840 B1 | 7/2001 | Watanabe et al. |
| 6,623,668 B1 | 9/2003 | Murakami et al. |
| 2002/0045028 A1 | 4/2002 | Teshima et al. |
| 2004/0106223 A1 | 6/2004 | Kaneko et al. |

FOREIGN PATENT DOCUMENTS

| CN | 1490635 A | 4/2004 |
| CN | 1222785 C | 10/2005 |
| EP | 0 911 654 A1 | 4/1999 |
| EP | 1 411 376 A1 | 4/2004 |

*Primary Examiner*—Timothy Thompson
(74) *Attorney, Agent, or Firm*—Birch, Stewart, Kolasch & Birch, LLP

(57) ABSTRACT

Disclosed is a microlens array sheet capable of improving a viewing angle by maintaining a fill factor while reducing a radius of curvature of the microlens of the microlens array sheet. To this end, the microlens array sheet includes: a substrate; a lens arranged on the substrate; and a gap filling layer formed at exposed surfaces of the substrate and the lens, wherein the lens is arranged as high as or at a higher position than a height of the gap filling layer formed at a gap between lenses arranged on the substrate.

20 Claims, 3 Drawing Sheets

MICROLENS ARRAY SHEET

BACKGROUND OF THE INVENTION

1. Field of the Invention

The present invention relates to a microlens and particularly, to a microlens array sheet.

2. Description of the Prior Art

In general, a microlens widely used in a fine optical system is being applied to an optical pickup head, an image sensor, various display systems and the like. One of the application examples is a microlens array sheet having microlenses of a few millimeters (mm)~tens of millimeters, which are disposed at a regular interval or a certain interval two-dimensionally.

The microlens array sheet is used for an image sensor, a panel of an LCD (liquid crystal display), a projection display system and the like, and is being increasingly applied to various display systems. For example, the microlens array sheet may be applied to a rear projection screen to magnify and project an image projected from a light source onto a screen, may be applied to an image sensor such as a CCD (charge coupled device) or a CMOS (complementary metal oxide semiconductor) imaging device, corresponding to a pixel of the image sensor to thereby improve sensitivity and reduce interference between pixels, or may be applied to a panel of an LCD to improve pixel contrast performance.

Hereinafter, the microlens array sheet which is applied to the rear projection screen will be described.

First, the projection display system is a system that magnifies and projects an image projected from a light source onto a screen to provide the image to viewers. The performance of the rear projection screen used in the projection display system is determined by various characteristics such as a gain, a viewing angle, a contrast, a resolution and the like. However, of such characteristics, a large optical viewing angle is required when a plurality of users watch the projection display system at the same time. If the viewing angle is small, a viewer placed at a lateral side of the projection display system cannot observe an accurate image.

FIG. 1 is a sectional view of a microlens array sheet applied to a rear projection screen in accordance with a prior art.

As shown, the microlens array sheet in accordance with the prior art includes a transparent substrate 1; a microlens 2 arranged on the transparent substrate 1; and a gap filling layer 3 formed on the substrate 1 and the microlenses 2.

The gap formed between the microlenses 2 is a main factor that causes deterioration in transmittance of the microlens array sheet. Therefore, in order to prevent such deterioration, the gap filling layer 3 is formed at the gap between the microlenses 2.

A fill factor of the microlens array sheet is maximized through the gap filling layer 3. However, because the gap filling layer 3 is formed not only on the surface of the microlens 2 but also on the surface of the transparent substrate 1 exposed between the microlenses 2 in a vertical direction in the process of forming the gap filling layer 3, a radius of curvature of each microlens 2 (microlens including the gap filling layer) becomes greater than an initially set value. Also, a sag height of each microlens 2 is lowered by a height (H) of the gap filling layer 3 formed vertically on the surface of the exposed transparent substrate 1. Accordingly, because of the gap filling layer 3 formed vertically on the surface of the exposed transparent substrate 1, a viewing angle of the microlens array sheet is decreased.

FIG. 2 is a sectional view which illustrates an optical path with respect to the microlens array sheet of FIG. 1 in accordance with the prior art.

As shown, a collimated beam 6 perpendicularly made incident upon the microlens array sheet 5 after passing through an optical system such as Fresnel Lens or the like is refracted at a certain angle by each microlens 2 provided at the microlens array sheet 5 and exits.

Because the radius of curvature of the microlens 2 is increased by the gap filling gap 3 (The radius of curvature of the microlens 2 means a radius of curvature of a microlens including the gap filling layer, and the gap filling layer is also a part of the microlens.), an angle of exiting light refracted at a lower end portion of the microlens 2 becomes smaller than an initially set value. Accordingly, it is difficult for a viewer to observe the projection display system from its lateral side.

Although the description has been made on the microlens array sheet applied to the rear projection screen, the decrease in viewing angle is also a problem of a microlens array sheet applied to different kinds of image sensors or display systems.

As described so far, the microlens array sheet in accordance with the prior art improves the transmittance by filling the gap between the microlens with the gap filling layer. However, because the gap filling layer is formed even on the transparent substrate exposed between the microlenses, a radius of curvature of the microlens is disadvantageously increased.

Also, as the radius of curvature of the microlens is increased, an angle of light refracted and exiting to a lower end portion of the microlens becomes smaller than an initially set value. Accordingly, a viewing angle of the display system applied to the microlens array sheet in accordance with the prior art is decreased.

A microlens array sheet in accordance with another prior art is disclosed in U.S. Pat. No. 5,555,476 issued on Sep. 10, 2004.

SUMMARY OF THE INVENTION

Therefore, an object of the present invention is to provide a microlens array sheet capable of improving a viewing angle by maintaining a fill factor while reducing a radius of curvature of a microlens of a microlens array sheet.

To achieve these and other advantages and in accordance with the purpose of the present invention, as embodied and broadly described herein, there is provided a lens array sheet comprising: a substrate; a lens arranged on the substrate; and a gap filling layer formed at exposed surfaces of the substrate and the lens, wherein the lens is arranged as high as or at a higher position than a height of the gap filling layer formed at a gap between the lenses arranged on the substrate.

To achieve these and other advantages and in accordance with the purpose of the present invention, as embodied and broadly described herein, there is provided a microlens array sheet comprising: a substrate; a base arranged on the substrate; a microlens formed on the base; and a gap filling layer formed on exposed surfaces of the substrate, the base and the microlens.

To achieve these and other advantages and in accordance with the purpose of the present invention, as embodied and broadly described herein, there is provided a microlens array sheet for a projection display system, comprising: a transparent substrate; a base formed on the transparent substrate and formed at a place where a microlens is to be arranged;

the microlens formed on the base; and a gap filling layer formed on exposed surfaces of the transparent substrate, the base and the microlens, wherein the gap filling layer is formed at a gap between the microlenses formed on the base, and a minimum height of the gap filling layer formed at the gap is lower than or the same as a height of the base.

To achieve these and other advantages and in accordance with the purpose of the present invention, as embodied and broadly described herein, there is provided a microlens array sheet comprising: a transparent substrate having a groove; a microlens arranged on the transparent substrate; and a gap filling layer formed on exposed surfaces of the groove and the microlens, wherein the groove is placed between the microlenses arranged on the transparent substrate.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Preferred embodiments of a microlens array sheet capable of reducing a radius of curvature of a microlens and improving a viewing angle by arranging a microlens as high as or at a higher position than a height of a gap filling layer formed at a gap between microlenses arranged on a substrate of a microlens array sheet will now be described with reference to FIGS. 3 to 5D.

Figure 1:
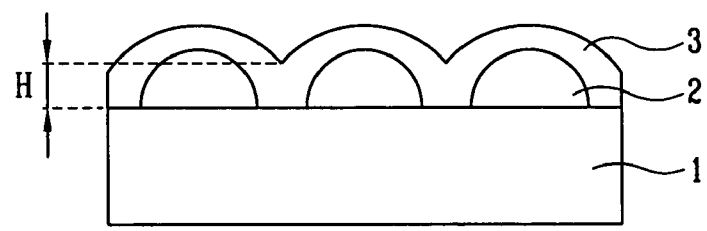
FIG. 1 is a sectional view of a microlens array sheet applied to a rear projection screen in accordance with the prior art.
Figure 2:
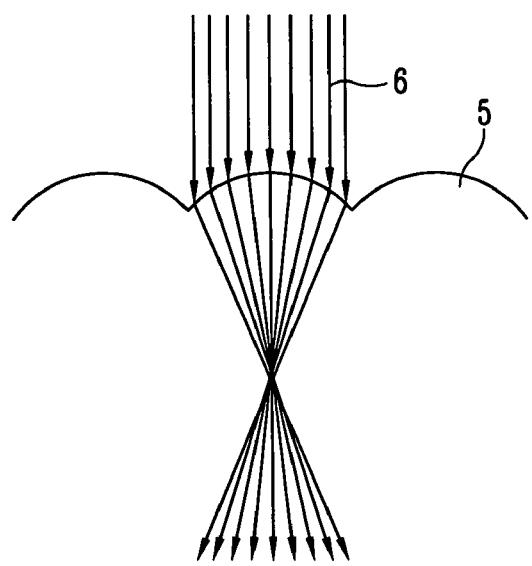
FIG. 2 is a sectional view which illustrates an optical path with respect to the microlens array sheet of FIG. 1 in accordance with the prior art.
Figure 3:
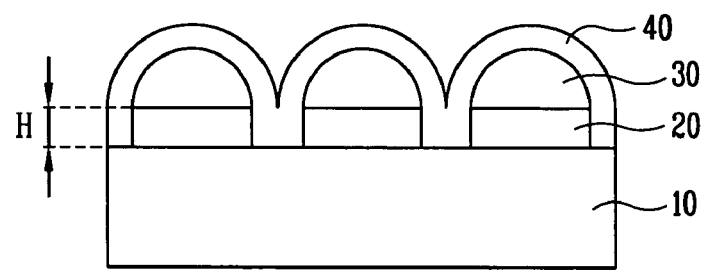
FIG. 3 is a sectional view which illustrates a microlens array sheet structure in accordance with a first embodiment of the present invention.

FIG. 3 is a sectional view which illustrates a microlens array sheet structure in accordance with the first embodiment of the present invention.

As shown, the microlens array sheet includes a transparent substrate 10; a base 20 arranged on the transparent substrate 10 and having a predetermined height; a microlens 30 formed on the base 20; and a gap filling layer 40 formed on exposed surfaces of the transparent substrate 10, the base 20 and the microlens 30. Because the microlens 30 may be formed through various known methods, detailed description on the microlens 30 will be omitted.

The gap filling layer 40 is formed at a surface of each microlens 30 and at a gap between the microlenses 30.

The base 20 is formed at the same location with the microlens 30, corresponding to the microlens array. Here, a height of the base 20 is the same as or higher than a minimum height (H) of the gap filling layer 40 formed at the gap.

Because the height between the microlens 30 and the transparent substrate 10 is higher than that in the prior art, a radius of curvature of the microlens 30 including the gap filling layer 40 is greatly reduced. As the height of the base 20 is the same as or higher than the minimum height of the gap filling layer 40 formed on the exposed surface of the transparent substrate 10, the gap filling layer 40 with a uniform thickness is formed on the surface of the microlens 40. Accordingly, the radius of curvature of the microlens 30 becomes smaller than that of the microlens in accordance with the prior art by the gap filling layer 40.

In contrast, if the height of the base 20 is lower than the minimum height of the gap filling layer formed on the exposed surface of the transparent substrate 10, the radius of curvature of the microlens 30 including the gap filling layer 40 is increased, thereby reducing an optical viewing angle.

Accordingly, by adjusting the height of the base 20, the optical viewing angle of the microlens array sheet can be adjusted. For this reason, the height of the base 30 can be determined corresponding to an optical viewing angle desired by a designer.

Preferably, the base 30 is formed of at least one of silicon, glass, transparent metal and organic polymer. A plane structure of the base 30 is the same as a structure of a bottom surface of the microlens 30. The bottom surface of the microlens may have a circular shape, an oval shape, a many-sided shape or a certain shape.

The microlens 30 may be made of an organic compound or an inorganic compound. In order to improve efficiency of the microlens 30, the microlens 30 may further include at least one selected from a metal film, a silicon oxide film, a silicon nitride film and an organic polymer.

The gap filling layer 40 is formed by general thin film forming methods. For example, the gap filling layer 40 may be formed by a thin film forming method such as electro plating, electroless plating, sputtering, evaporation, chemical vapor deposition (CVD), spin coating and spray coating.

Figure 4:
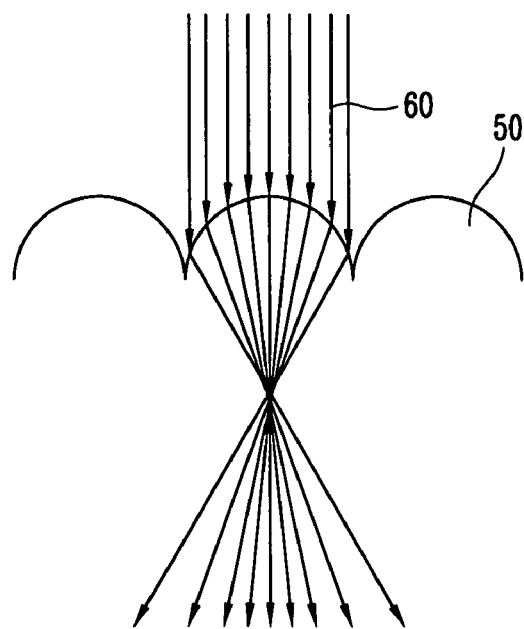
FIG. 4 is a view which illustrates an optical path with respect to the microlens array sheet in accordance with the first embodiment of the present invention.

FIG. 4 is a view which illustrates an optical path with respect to the microlens array sheet in accordance with the first embodiment of the present invention.

As shown, a collimated beam 6 perpendicularly made incident upon the microlens array sheet 50 after passing through an optical system such as Fresnel Lens is refracted at a certain angle by each microlens 30 disposed at the microlens array sheet 50 and exits. Namely, because the radius of curvature of the microlens 30 including the gap filling layer 40 is small, each microlens 30 maintains a semicircular shape. Accordingly, an angle of exiting light refracted at a lower end portion of the microlens 30 is wider than that in the related art.

If the microlens array sheet 50 in accordance with the present invention is applied to a rear projection screen for a projection display system, an image may be provided to viewers within a wide radius through a wide viewing angle.

FIGS. 5A to 5D are sectional views which illustrate a microlens array sheet structure and its manufacturing method in accordance with a second embodiment of the present invention. Namely, the microlens array sheet in accordance with the second embodiment of the present invention has a structure in which a microlens 22 is formed on a protrusion defined by a groove 44 formed at a transparent substrate 11 without forming the base 20.

The microlens array sheet in accordance with the second embodiment of the present invention includes: a transparent substrate 11 having a groove 44; a microlens 22 arranged on the transparent substrate 11 adjacently to the groove 44; and a gap filling layer 33 formed at exposed surfaces of the groove 44 and the microlens 22.

The groove 44 formed on the transparent substrate 11 is formed at a gap (space) between the microlenses 22, and the gap filling layer 33 fills in the groove 44 as high as or at a lower height than a depth of the groove 44.

Also, the microlens 22 is formed at the surface of the transparent substrate 11 between the grooves 44, and a radius of curvature of the microlens 22 is determined by the depth of the groove 44.

Figure 5A:
FIGS. 5A to 5D are sectional views which illustrate a microlens array sheet structure and its manufacturing method in accordance with a second embodiment of the present invention.
Figure 5B:
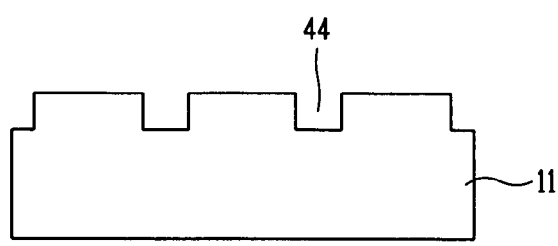

As shown in FIGS. 5A and 5B, the groove 44 formed on the transparent substrate 11 is formed by etching a portion of the transparent substrate 11 through a photolithography process. As the etching process, dry etching or wet etching may be selectively applied according to a material of the transparent substrate 11. A surface structure of the protrusion formed on the surface of the transparent substrate 11 after the etching process has the same plane structure as a structure of a bottom surface of the microlens 22.

Figure 5C:
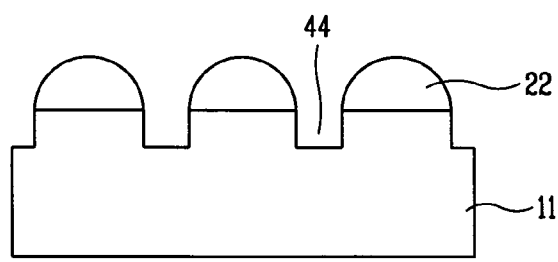
Figure 5D:
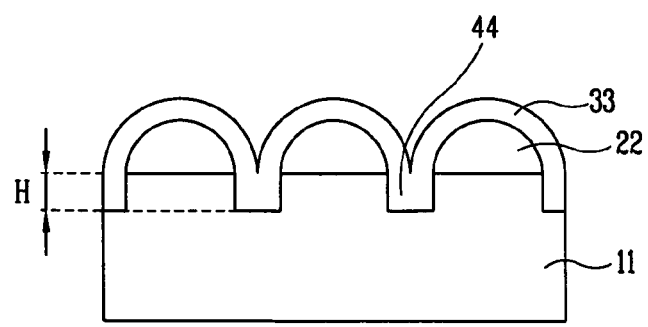

As shown in FIGS. 5C and 5D, the microlens 22 is installed on the protrusion defined by the groove 44, and the gap filling layer 33 is formed on the exposed surfaces of the groove 44 and the microlens 22. The minimum height (H) of the gap filling layer 33 formed at the groove 44 is the same as or lower than the depth of the groove 44, and a surface structure of the protrusion defined by the groove 44, of the transparent substrate 11 is the same as the structure of a bottom surface of the microlens 22.

As the gap filling layer 33 formed at the groove 44 of a gap (or space) between the microlenses 22 has a height which is the same as or lower than the depth of the groove 44, a radius of curvature of the microlens 22 is decreased, and an optical viewing angle of the microlens array sheet is improved.

Accordingly, the microlens array sheet formed by the present invention may greatly improve a viewing angle while maintaining a fill factor similar to that of a microlens array sheet in accordance with the related art, and a viewing angle may be easily adjusted by an intention of a designer.

The microlens array sheet is for forming an original plate for mass production. A fine structure of the microlens array sheet, an original plate manufactured through the aforementioned manufacturing method may be used as a mold to manufacture a master. By using technologies such as mold copy or injection, microlens array sheet copies having the same structure can be mass produced.

Preferably, the microlens array sheet in accordance with the present invention is applied to a rear projection screen, and may be applied to various display systems requiring high brightness and a large viewing angle. As the microlens array sheet in accordance with the present invention is added to various image sensors such as CCD or CMOS imaging device, light receiving sensibility and resolution can be improved. Also, it may be used for an LCD panel, thereby improving contrast performance.

As described so far, in the microlens array sheet in accordance with the present invention, the microlens is arranged as high as or at a higher position than a minimum height (H) of a gap filling layer 400 formed at a gap between the microlenses. Thus, a radius of curvature of the microlens may be reduced by the gap filling layer. Namely, by reducing the radius of the microlens by the gap filling layer, optical viewing angles of various display systems employing the microlens array sheet in accordance with the present invention can be improved. Accordingly, the microlens array sheet in accordance with the present invention may be used for screens of the various display systems requiring high brightness and a large optical angle, and may also be applied as optical sheets of various image sensors, thereby greatly improving light receiving sensitivity and resolution.

Also, the microlens array sheet in accordance with the present invention may improve contrast performance by being applied to an LCD panel.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A lens array sheet comprising:
   a substrate;
   a lens having a bottom surface arranged on the substrate; and
   a gap filling layer formed at exposed surfaces of the substrate and the lens,
   wherein the bottom surface of the lens is arranged as high as or at a higher position than a height of the gap filling layer formed at a gap between lenses arranged on the substrate.

2. The lens array sheet of claim 1, further comprising:
   a base formed on the substrate,
   wherein the lens is formed on the base.

3. A lens array sheet comprising:
   a substrate;
   a base located on the substrate;
   a lens located on the base; and
   a gap filling layer formed at exposed surfaces of the substrate and the lens;
   wherein the lens is arranged as high as or at a higher position than a height of the gap filling layer formed at a gap between lenses arranged on the substrate; and
   wherein a height of the base is the same as or higher than a minimum height of the gap filling layer formed at the gap.

4. A lens array sheet comprising:
   a substrate;
   a base located on the substrate;
   a lens located on the base; and
   a gap filling layer formed at exposed surfaces of the substrate and the lens;
   wherein the lens is arranged as high as or at a higher position than a height of the gap filling layer formed at a gap between lenses arranged on the substrate; and
   wherein a plane structure of the base is the same as a structure of a bottom surface of the lens.

5. The lens array sheet of claim 2, wherein a radius of curvature of the gap filling layer above the lens varies according to a variation in a height of the base.

6. A lens array sheet comprising:
   a substrate;
   a lens arranged on the substrate; and
   a gap filling layer formed at exposed surfaces of the substrate and the lens, wherein the lens is arranged as high as or at a higher position than a height of the gap filling layer formed at a gap between lenses arranged on the substrate; and further comprising:
a groove placed at a gap between the lenses and formed on the substrate,
wherein a height of the gap filling layer formed at the groove is lower than or the same as a depth of the groove.

7. The lens array sheet of claim 6, wherein a surface structure of a protrusion of the substrate, which is defined by the groove, is the same as a structure of a bottom surface of the lens.

8. The lens array sheet of claim 6, wherein a radius of curvature of the gap filling layer above the lens varies according to a variation in a depth of the groove.

9. The lens array sheet of claim 6, wherein a radius of curvature of the gap filling layer above the lens varies according to a variation in a depth of the groove.

10. A microlens array sheet comprising:
a substrate;
a base arranged on the substrate;
a microlens formed on the base; and
a gap filling layer formed on exposed surfaces of the substrate, the base and the microlens,
wherein a height of the gap layer formed at a gap between the microlenses formed on the base is lower than or the same height as a height of the base.

11. The microlens array sheet of claim 10, wherein a plane structure of the base is the same as a structure of a bottom surface of the microlens.

12. The microlens array sheet of claim 10, wherein a radius of curvature of the gap filling material above the microlens varies according to a variation in a height of the base.

13. A microlens array sheet for a projection display system, comprising:
a transparent substrate;
a base formed on the transparent substrate;
a microlens formed on the base; and
a gap filling layer formed on exposed surfaces of the transparent substrate, the base and the microlens,
wherein the gap filling layer is formed at a gap between microlenses formed on bases of the transparent substrate, and a minimum height of the gap filling layer formed at the gap is lower than or the same as a height of the base.

14. The microlens array sheet of claim 13, wherein the base is formed of at least one of silicon, glass, transparent metal and organic polymer.

15. The microlens array sheet of claim 13, wherein a plane structure of the base is the same as a structure of a bottom surface of the microlens.

16. The microlens array sheet of claim 15, wherein the plane structure of the base is one of a circular shape, an oval shape and a many-sided shape.

17. A microlens array sheet comprising:
a transparent substrate having a groove;
a microlens arranged on the transparent substrate; and
a gap filling layer formed on exposed surfaces of the groove and the microlens,
wherein the groove is placed between microlenses arranged on the transparent substrate.

18. The microlens array sheet of claim 17, wherein a height of the gap filling layer formed at the groove is lower than or the same as a depth of the groove.

19. The microlens array sheet of claim 17, wherein a surface structure of a protrusion of the transparent substrate, which is defined by the groove, is the same as a structure of a bottom surface of the microlens.

20. The microlens array sheet of claim 17, wherein a radius of curvature of the microlens is determined according to a depth of the groove.

* * * * *